United States Patent [19]

Haldric

[11] Patent Number: 4,537,523
[45] Date of Patent: Aug. 27, 1985

[54] DEVICE FOR DETECTING THE POSITION OF A SHAFT IN A COUPLING ELEMENT, AND IN PARTICULAR A UNIVERSAL JOINT YOKE

[75] Inventor: Bernard Haldric, Vendome, France

[73] Assignee: NACAM, Vendome, France

[21] Appl. No.: 617,638

[22] Filed: Jun. 6, 1984

[30] Foreign Application Priority Data

Jun. 13, 1983 [FR] France .............................. 83 09757

[51] Int. Cl.³ ............................................. F16B 41/00
[52] U.S. Cl. ........................................ 403/12; 403/17; 403/19; 403/27; 403/21
[58] Field of Search ........................ 403/11, 12, 13, 14, 403/27, 324, 57, 21, 22, 17, 19

[56] References Cited

U.S. PATENT DOCUMENTS 2,673,750  3/1954  Scheiwer .
3,868,127  2/1975  Marulic et al. ................... 403/27 X
4,125,337  11/1978  Recker .
4,289,414  9/1981  Recker .

FOREIGN PATENT DOCUMENTS 2458002  5/1979  France .
816174  9/1957  United Kingdom .

Primary Examiner—Andrew V. Kundrat
Attorney, Agent, or Firm—Robert E. Burns; Emmanuel J. Lobato; Bruce L. Adams

[57] ABSTRACT

A device for detecting the position of a coupling element having a split hub 3 provided with ears 6 constituting a clamping means clamping the hub to the shaft 13 or other torque transmitting element, the ears 6 having throughway apertures 7 for receiving a tightening screw for the clamping means. The device comprises a resiliently yieldable element 8 mounted between the ears 6 and extending across the apertures 7 formed in the ears for preventing the positioning of the tightening screw in the absence of the shaft 13. The element 8 is retractable by the insertion of the shaft 13 in the hub 3 of the coupling element.

11 Claims, 8 Drawing Figures

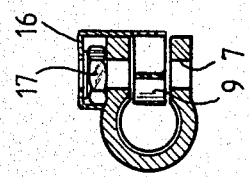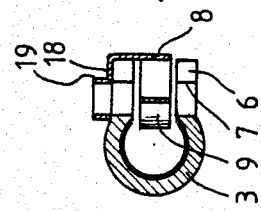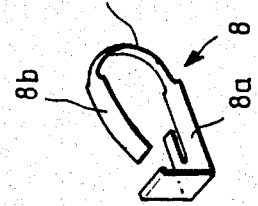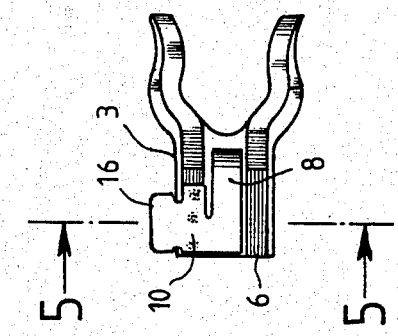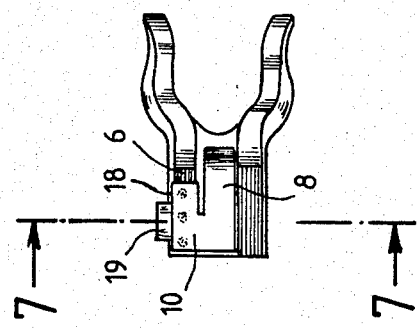

DEVICE FOR DETECTING THE POSITION OF A SHAFT IN A COUPLING ELEMENT, AND IN PARTICULAR A UNIVERSAL JOINT YOKE

The present invention relates to coupling elements, such as universal joining yokes, and more particularly concerns coupling elements having a split hub.

Some universal joints are formed by two yokes, each of which is connected to a shaft or like element, and a spider connecting the two yokes together.

In many cases, the yokes have a split hub which is clamped on the corresponding shaft by a screw.

Elements also exist for coupling a shaft with another element, such as a resiliently yieldable connecting disk usually employed in motor vehicle steering columns.

These elements, which, are obtained a large number of universal joint yokes, by bending and rolling sheet blanks, usually have a split hub.

An object of the invention is to provide a device for ensuring that the hub of the coupling element is disposed in the position that it must occupy on the shaft to which it is fixed.

The invention therefore provides a device for detecting the position of a coupling element having a split hub and ears constituting clamping means for clamping the hub to the shaft or other torque transmitting element, said ears being provided with throughway apertures receiving a screw for tightening the clamping means, said device further comprising a resiliently yieldable element which is mounted between the ears of the coupling means and extends across the apertures provided in said ears so as to prevent the positioning of the clamping screw in the absence of said shaft, the resiliently yieldable element being retractable by the introduction of the shaft in the hub of the coupling element.

A better understanding of the invention will be had from the following description of one embodiment of the invention, which is given solely by way of example, with reference to the accompanying drawings in which:

FIG. 4 is a top plan view of a universal joint yoke provided with another embodiment of the detecting device according to the invention;

FIG. 5 is a sectional view taken on line 5—5 of FIG. 4;

FIG. 6 is a bottom plan view of a universal joint yoke provided with another embodiment of the detecting device according to the invention;

FIG. 7 is a sectional view taken on line 7—7 of FIG. 6, and

FIG. 8 is a perspective view of a modification of the detecting device which has a variable width.

Figure 1:
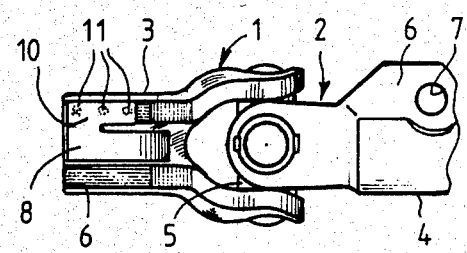
FIG. 1 is an elevational view of a universal joint provided with a detecting device according to the invention.

FIG. 1 shows a universal joint including a first yoke 1 and a second yoke 2 having split hubs 3 and 4, defining an axial passage, the branches of the yokes being interconnected by a spider 5. Each of the hubs 3 and 4 has, in the known manner, generally planar ears 6 adapted to constitute a clamping means for clamping the corresponding hub on a shaft or other transmitting element. The ears 6 have aligned throughway apertures 7 for receiving a tightening screw.

Each of the yokes is provided with a device 8 for detecting the presence and the position of a shaft or other torque transmitting element in the hub of said yoke. This detecting device comprises a resiliently yieldable element formed from a spring strip bent onto itself in the manner shown in FIG. 2 and engaged between the ears of the clamping means in such manner that the bent end portion 9 of the strip is disposed across the apertures 7 receiving the tightening screw when no shaft is inserted in the axial passage of the hub of the yoke. The detecting device 8 further comprises a lateral tab 10 by which it is fixed to one of the ears 6 of the clamping means of the hub, for example by spot welding as shown at 11 in FIG. 1, or by means of a screw or any other suitable means.

Thus the lateral tab 10 may also be fixed to the corresponding ear 6 by riveting or by a setting operation achieved by crushing a projection formed on the ear 6 in the form of a lug inserted in a corresponding aperture provided in the tab 10.

Figure 2:
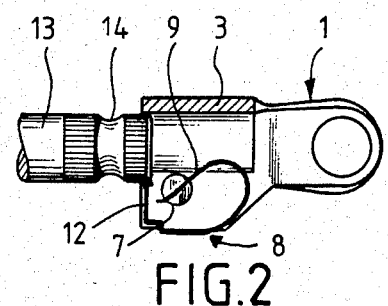
FIG. 2 is an elevational and sectional view of a universal joint yoke provided with a detecting device according to the invention, before the yoke is engaged on a shaft.

Moreover, FIG. 2 shows that the detecting device further comprises a branch 12 constituting a heel and extending in a direction perpendicular to the fixing tab 10.

FIG. 2 shows that, before the insertion of the shaft 13 which is provided with a positioning and immobilizing groove 14, in the hub 3 of the yoke, the bent end portion 9 of the strip 8 occupies a position extending transversely of the apertures 7 for receiving the tightening screw, so that this screw cannot be inserted in these apertures in the absence of the shaft 13 in the hub.

Figure 3:
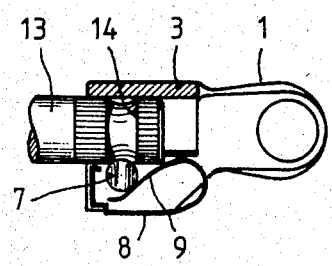
FIG. 3 is an elevational and sectional view corresponding to that of FIG. 2, showing the shaft engaged in the hub of the yoke.

On the other hand, when the shaft 13 has been placed in position in the hub 3 as shown in FIG. 3, its end portion compresses the bent end portion 9 of the strip 8 and moves or retracts the strip from the apertures 7 which can then receive a tightening screw (not shown), which also positively immobilizes the hub 3 of the yoke on the shaft 13 by engagement in the peripheral groove 14.

The universal joint yoke shown in FIG. 4 is provided with a detecting device similar to that provided on the yokes shown in FIGS. 1 to 3, except that this device includes, in addition to the curved strip 8 disposed between the ears 6 of the hub 3 and the fixing tab 10, a portion 16 bent at a right angle and contained in a plane parallel to the axis of the yoke and adapted to maintain in position a nut 17 in which must be engaged the tightening screw which extends through the apertures 7 formed in the ears 6. This bent portion 16 is shown more clearly in FIG. 5.

According to another embodiment shown in FIG. 6, the detecting device comprises, as in the preceding embodiment, a strip 8 which is bent onto itself and constitutes the detecting means proper, a lateral tab 10 for fixing the device on a ear 6 of the clamping means of the hub and a portion 18 bent at a right angle in which is formed by deformation an annular projection 19 which is in alignment with the apertures 7 formed in the ears of the clamping means on the hub. The annular projection 19 may be tapped so as to replace the tightening nut or may be employed as a means for stopping the unscrewing of a nut.

As the bent strip 8 is engaged between the ears 6 of the clamping means on the hub, it can perform the function, if its width is correctly determined, of a spacer member limiting the deformations of the ears 6 if the clamping force applied to these ears by the tightening screw and nut exceeds a given value.

In the various embodiments just described, the strip of the detecting device has a constant width. However, this strip may be arranged in the manner shown in FIG. 8 in which it has a variable width and includes, between two portions 8a, 8b of greater width adapted to form if desired a spacer means limiting the extent to which the ears 6 of the clamping means are urged together, a thinner intermediate portion 8c. Such an arrangement imparts to the strip 8 increased flexibility in the region where it must undergo resilient deformations resulting from the insertion of the shaft in the hub.

The detecting device just described provides a simple and cheap means for ascertaining the presence of a shaft in the hub of a universal joint yoke or of a coupling element, which avoids assembling errors and facilitates the automatization of the assembly of these elements.

What is claimed is:

1. A device for detecting the position of a coupling element having a split hub and spaced apart ears of clamping means for the hub, on a shaft or other torque transmitting element, said hub defining a throughway passage for said shaft, said ears defining throughway apertures for receiving a screw for tightening the clamping means, said device comprising a resiliently yieldable element mounted on the hub and having a strip disposed between said ears and extends into said passageway and an end portion which extends across said apertures to prevent full insertion of said screw in said apertures in the absence of said shaft, said strip of the resiliently yieldable element being positioned and arranged to be urged by said shaft laterally back out of the path of the shaft upon insertion of said shaft in the hub of the coupling element so that said end portion ceases to extend across said apertures and clears the screw when the shaft has sufficiently penetrated the hub.

2. A device according to claim 1, wherein said strip is bent onto itself and has a tab in one piece with the strip, said strip being fixed to one of said ears by said tab, and said end portion of the strip being bent.

3. A device according to claim 2, wherein said tab is welded to the ear of the clamping means of the hub.

4. A device according to claim 2, wherein said tab is fixed to the ear of the clamping means of the hub by screw means.

5. A device according to claim 2, wherein said tab is fixed to the ear of the clamping means of the hub by rivetting means.

6. A device according to claim 2, wherein said tab is fixed to the ear of the clamping means of the hub by a setting assembly.

7. A device according to claim 2, comprising, in one piece with said tab and in opposed relation to the resiliently yieldable element, a portion bent at a right angle for maintaining a nut for cooperation with said tightening screw.

8. A device according to claim 2, comprising, in one piece with said tab and in opposed relation to the resiliently yieldable element, a portion bent at a right angle in which bent portion is formed an annular projection tapped for forming a nut for cooperation with said screw.

9. A device according to claim 2, comprising, in one piece with said tab and in opposed relation to the resiliently yieldable element, a portion bent at a right angle in which bent portion is formed an annular projection for acting as means for stopping rotation of a nut.

10. A device according to claim 1, wherein said resiliently yieldable element forms a spacer member for limiting the extent to which the ears move toward each other when the clamping force exerted by said screw on said ears exceeds a predetermined value.

11. A device according to claim 1, wherein said resiliently yieldable element includes a narrower portion located between two portions of greater width and adapted to increase the flexibility of the resiliently yieldable element in a region where subjected to the greatest deformations.

* * * * *